United States Patent
Tallamy et al.

(10) Patent No.: US 11,736,588 B2
(45) Date of Patent: Aug. 22, 2023

(54) HETEROGENEOUS MEDIA EDITING ACROSS STORAGE PLATFORMS

(71) Applicant: EDITSHARE, LLC, Watertown, MA (US)

(72) Inventors: Stephen Charles Tallamy, Sandhurst (GB); Andrew P. Liebman, Brookline, MA (US)

(73) Assignee: EDITSHARE, LLC, Watertown, MA (US)

( * ) Notice: Subject to any disclaimer, the term of this patent is extended or adjusted under 35 U.S.C. 154(b) by 0 days.

(21) Appl. No.: 17/241,822

(22) Filed: Apr. 27, 2021

(65) Prior Publication Data

US 2021/0337042 A1 Oct. 28, 2021

Related U.S. Application Data

(60) Provisional application No. 63/016,550, filed on Apr. 28, 2020.

(51) Int. Cl.
*H04L 67/5651* (2022.01)
*G06F 16/18* (2019.01)
(Continued)

(52) U.S. Cl.
CPC ...... *H04L 67/5651* (2022.05); *G06F 3/04883* (2013.01); *G06F 16/1734* (2019.01); *G06F 16/18* (2019.01); *G06F 16/483* (2019.01); *G06F 16/955* (2019.01); *H04L 65/70* (2022.05); *H04N 21/44226* (2020.08); *H04N 21/8352* (2013.01)

(58) Field of Classification Search
CPC ........ G06F 16/13; G06F 16/176; G06F 3/165; G06F 3/0484; G06F 3/04883
See application file for complete search history.

(56) References Cited

U.S. PATENT DOCUMENTS

| 6,211,869 B1 * | 4/2001 | Loveman | G11B 27/34 725/98 |
| 10,546,011 B1 * | 1/2020 | Dunham | H04L 65/70 |

(Continued)

OTHER PUBLICATIONS

International Search Report and Written Opinion from corresponding International Application No. PCT/US2021/029489 dated Jul. 28, 2021.

(Continued)

*Primary Examiner* — Barbara B Anyan
(74) *Attorney, Agent, or Firm* — Lando & Anastasi, LLP

(57) ABSTRACT

Techniques for heterogenous video editing across storage platforms are disclosed, including: mapping a first mount in a local system to a first location in a first type of storage system, the first location including a first representation of the media object; mapping a second mount in the local system to a second location in a second type of file system, the second location including a second representation of the media object that is timecode-aligned with the first representation of the media object, the second representation being different from the first representation; and providing the first mount in the local system and the second mount in the local system to the media editing application, to enable the media editing application to switch between the first representation of the media object and the second representation of the media object via the local system.

22 Claims, 14 Drawing Sheets

(51) Int. Cl.
*G06F 16/955* (2019.01)
*G06F 16/483* (2019.01)
*H04L 65/70* (2022.01)
*G06F 16/17* (2019.01)
*G06F 3/04883* (2022.01)
*H04N 21/8352* (2011.01)
*H04N 21/442* (2011.01)

(56) References Cited

U.S. PATENT DOCUMENTS

| | | | |
|---|---|---|---|
| 11,289,125 B1* | 3/2022 | Adler | G11B 27/031 |
| 2010/0050080 A1 | 2/2010 | Libert et al. | |
| 2012/0210217 A1* | 8/2012 | Abbas | H04N 5/14 715/716 |
| 2013/0013619 A1 | 1/2013 | Lacapra et al. | |
| 2013/0125000 A1 | 5/2013 | Fleischhauer et al. | |
| 2013/0151970 A1* | 6/2013 | Achour | G06Q 10/101 715/723 |
| 2014/0129942 A1* | 5/2014 | Rathod | H04N 21/44226 715/720 |
| 2015/0234571 A1* | 8/2015 | Lee | G06F 3/04883 715/721 |
| 2016/0365124 A1* | 12/2016 | Galant | G06F 3/0484 |
| 2017/0094341 A1* | 3/2017 | Berner | H04N 21/8352 |
| 2017/0251241 A1 | 8/2017 | Baratz | |
| 2018/0276267 A1* | 9/2018 | Bestler | G06F 16/13 |
| 2019/0108241 A1* | 4/2019 | Emerick | G06F 16/1734 |
| 2019/0155870 A1* | 5/2019 | Prakash | G06F 40/103 |
| 2019/0374842 A1* | 12/2019 | Guralnick | G06F 3/167 |
| 2020/0304854 A1* | 9/2020 | Baumgartner | H04L 65/80 |

OTHER PUBLICATIONS

Marshall, "Seamless Proxy Workflow in Premiere Pro", Mar. 20, 2017 (Mar. 20, 2017) [retrieved 1-20 on Jun. 27, 2021]. Retrieved from the Internet <URL: https://blog.frame.io/2017103/20/using-premiere-pro-proxy-workflows/>.

Vantage, "Installing and Using the Vantage Panel for Adobe Premiere Pro", Apr. 30, 2017 10-13 (Apr. 30, 2017) [retrieved on Jun. 27, 2021]. Retrieved from the Internet <URL: http://www.telestream.neUpdfs/app-notes/app VantageAdobePremiere.pdf>.

"Google Cloud Storage FUSE Documentation" as of Jan. 8, 2021 [https://web.archive.org/web/20210108184623/https://cloud.google.com/storage/docs/gcs-fuse], retrieved from The Wayback Machine on Jul. 15, 2021.

* cited by examiner

| Name ▼ | Last modified ▼ | Size ▼ | Storage class ▼ |
|---|---|---|---|
| 160929_057_London_WestminsterBridge7_1080p.mp4 | Sep 3, 2020 11:41:52 PM GMT+0100 | 59.3 MB | Standard |
| 160929_118_London_TowerBridge3_1080p.mp4 | Sep 3, 2020 11:41:52 PM GMT+0100 | 60.5 MB | Standard |
| 160929_126_London_TowerBridge7_1080p.mp4 | Sep 3, 2020 11:41:52 PM GMT+0100 | 67.7 MB | Standard |
| 160929_129_London_NightTrafficBokeh_1080p.mp4 | Sep 3, 2020 11:41:52 PM GMT+0100 | 78.2 MB | Standard |
| 160929_130_London_TowerBridgeNight2_1080p.mp4 | Sep 3, 2020 11:41:52 PM GMT+0100 | 61.1 MB | Standard |
| 160929_132_London_SkylineNight_1080p.mp4 | Sep 3, 2020 11:44:18 PM GMT+0100 | 63.8 MB | Standard |
| 160929_147_London_BusNight_1080p.mp4 | Sep 3, 2020 11:44:19 PM GMT+0100 | 69.9 MB | Standard |
| 160929_148_London_BusNight2_1080p.mp4 | Sep 3, 2020 11:45:20 PM GMT+0100 | 20.0 MB | Standard |
| 160929_151_London_NightTraffic2_1080p.mp4 | Sep 3, 2020 11:45:55 PM GMT+0100 | 70.8 MB | Standard |
| 160929_153_London_NightTraffic4_1080p.mp4 | Sep 3, 2020 11:46:26 PM GMT+0100 | 60.0 MB | Standard |
| 160929_159_London_BigBenNight2_1080p.mp4 | Sep 3, 2020 11:46:47 PM GMT+0100 | 66.2 MB | Standard |
| 160929_160_London_LondonEyeTimeLapseNight_1080p.mp4 | Sep 3, 2020 11:47:13 PM GMT+0100 | 85.5 MB | Standard |
| 160929_163_London_PiccadillyCircusNight_1080p.mp4 | Sep 3, 2020 11:47:51 PM GMT+0100 | 71.6 MB | Standard |

302 High-resolution video clips

| Name | Date modified | Type | Size |
|---|---|---|---|
| 160929_057_London_WestminsterBridge7... | 9/3/2020 11:41 PM | MP4 Video | 60,683 KB |
| 160929_118_London_TowerBridge3_1080p | 9/3/2020 11:41 PM | MP4 Video | 61,919 KB |
| 160929_126_London_TowerBridge7_1080p | 9/3/2020 11:41 PM | MP4 Video | 69,374 KB |
| 160929_129_London_NightTrafficBokeh_1... | 9/3/2020 11:41 PM | MP4 Video | 80,107 KB |
| 160929_130_London_TowerBridgeNight2_... | 9/3/2020 11:44 PM | MP4 Video | 62,596 KB |
| 160929_132_London_SkylineNight_1080p | 9/3/2020 11:44 PM | MP4 Video | 65,300 KB |
| 160929_147_London_BusNight_1080p | 9/3/2020 11:45 PM | MP4 Video | 71,560 KB |
| 160929_148_London_BusNight2_1080p | 9/3/2020 11:45 PM | MP4 Video | 20,488 KB |
| 160929_151_London_NightTraffic2_1080p | 9/3/2020 11:45 PM | MP4 Video | 72,539 KB |
| 160929_153_London_NightTraffic4_1080p | 9/3/2020 11:46 PM | MP4 Video | 61,471 KB |
| 160929_159_London_BigBenNight2_1080p | 9/3/2020 11:46 PM | MP4 Video | 67,748 KB |
| 160929_160_London_LondonEyeTimeLap... | 9/3/2020 11:47 PM | MP4 Video | 87,538 KB |
| 160929_163_London_PiccadillyCircusNig... | 9/3/2020 11:47 PM | MP4 Video | 73,354 KB |
| 160929_167_London_PiccadillyCircusNig... | 9/3/2020 11:48 PM | MP4 Video | 67,270 KB |
| London street bokeh HS049 | 9/3/2020 11:50 PM | QuickTime Movie | 50,312 KB |
| London_street_in_and_out_of_focus | 9/3/2020 11:50 PM | QuickTime Movie | 17,154 KB |
| PedestrianCrossingVideo | 9/3/2020 11:50 PM | QuickTime Movie | 30,734 KB |
| Picadilly Circus 1-Stock Video | 9/3/2020 11:50 PM | QuickTime Movie | 26,126 KB |
| The Clash - London Calling Album Versio... | 9/3/2020 11:51 PM | MP3 Format Sound | 7,808 KB |
| Train_Timelapse | 9/3/2020 11:51 PM | QuickTime Movie | 34,419 KB |
| Tube1-Stock video | 9/3/2020 11:52 PM | QuickTime Movie | 12,708 KB |
| Underground Sign-Stock Video | 9/3/2020 11:52 PM | QuickTime Movie | 6,118 KB |

304 Mounted folder 22 items

FIG. 3G

EditShare

Import Manager — 308 Import Manager

File name | Main source/High res | Proxy

| 160929_130_London_TowerBr_ | 2048 x 1080 ·160929_130_<br>SPE | Proxy 512 x 270 ·160929_13_<br>SPE |
| 160929_159_London_BigBen_ | 2048 x 1080 ·160929_159_<br>SPE | Proxy 512 x 270 ·160929_15_<br>SPE |
| London_street_in_and_out_of_ | 1920 x 1080 ·London_street_<br>SPE | Proxy 960 x 540 ·London_str_<br>SPE |
| 160929_160_London_London_ | 2048 x 1080 ·160929_160_<br>SPE | Proxy 512 x 270 ·160929_16_<br>SPE |

Cancel   Import

HETEROGENEOUS MEDIA EDITING ACROSS STORAGE PLATFORMS

RELATED APPLICATIONS

This application claims the benefit of U.S. Provisional Patent Application Ser. No. 63/016,550, titled "HETEROGENEOUS VIDEO EDITING ACROSS STORAGE PLATFORMS" and filed Apr. 28, 2020, which is hereby incorporated by reference in its entirety.

BACKGROUND

Non-linear video editing (NLE) requires low-latency, high-throughput access to storage. The amount of storage required for a video production can span into hundreds of terabytes of content that cannot be stored on local workstations and that often needs to be shared between multiple users. Therefore, media content is typically streamed from centralized storage to the workstation, using open protocols such as Server Message Block (SMB), Network File System (NFS), and/or proprietary protocols such as the EditShare File System (EFS) client by EditShare, LLC. Block storage provides various performance benefits—for example, block-level striping can provide faster read access, and block-based storage allows for editing relatively small portions of files without needing to retrieve the whole file. However, as editing solutions move to virtualized or cloud platforms, providing video editing storage backed by block storage becomes costly at scale. Some examples of block storage solutions include Amazon Web Services (AWS) Elastic Block Store, Google Persistent Disk, and Azure Disk Storage.

In comparison to block storage, object storage is a more cost-effective storage option. Some examples of object storage solutions include AWS S3, Google Cloud Storage, and Azure Blob Storage. Object storage solutions do not present a standard file system to clients and are not currently tuned for the low-latency file streaming required for video editing. Instead, object storage solutions rely on content distribution network (CDN) caching solutions to provide massive scalability and lower latency. CDN solutions are optimized for many (e.g., hundreds or thousands) of users accessing the same video. Only the first viewer "hits" the object storage; subsequent viewers get a cached version. This method is not optimized for small numbers of video editors, who are unlikely to have significant common caching and will not tolerate the latency for a non-cache hit.

Proxy-based workflows can provide a compromise between the cost of block storage and performance limitations of object storage. Original high-resolution media files can be stored on less expensive object storage. A media-management (MAM) application transforms (e.g., transcodes) those files into much smaller—but lower-quality—"proxy files" that are then stored on a relatively small amount of the expensive block storage. The video editor works with these proxy files until the end of the editing process, at which point some process must be deployed to switch back to the original high-resolution files.

Current proxy workflows suffer from a variety of problems and complications. Getting a video editing application to equate a proxy file and an original file as two versions of the same thing is typically a manual process that is fraught with uncertainties. Editors often need to see the original high-quality files during an edit and not just at the end—for instance, to determine if a shot is really in focus, if there is some defect in the shot, or if a color or lighting correction is going to have the desired effect. In addition, moving original high-resolution files (or pieces of these files) from object storage back to block storage for the final stage of an edit adds time to the production process, which may translate to delays in delivery time and/or additional monetary costs. If the process of "relinking" back to the original high-resolution files fails for any reason, remedying the failure can be an arduous manual process.

Some solutions layer Portable Operating System Interface (POSIX) or POSIX-like file system features over object storage. For example: open source s3fs-fuse is an SMB frontend for generic S3; LucidLink provides proprietary POSIX emulation and striping across object buckets (e.g., S3, Azure, Google, Wasabi, etc.); CephFS is an open source POSIX frontend for Ceph object storage; IBM's Cleversafe includes a proprietary NFS and SMB frontend, in addition to S3; NetApp's StorageGrid includes a proprietary NFS and SMB front end, in addition to S3; Scality's RING includes a proprietary NFS and Common Internet File System (CIFS) front end, in addition to S3; and Quantum StorNext presents tiers of storage through a unified proprietary file system interface. The EditShare File System (EFS) uses a metadata server to provide a POSIX frontend for object storage. None of these solutions are optimized for video editing applications while presenting a common file system across object storage and block storage.

Some proxy editing workflows include toggling techniques whereby a user can "toggle," or switch, between viewing the high-resolution content and proxy media. For example, Adobe Premiere Pro Pro, DaVinci Resolve, and EditShare's Lightworks and FLOW Story video editors include "toggle media" options that enable switching between viewing the best-available resolution and a lower proxy resolution. However, before an application can toggle between viewing different resolutions, it must know that the different resolutions are variants of the same thing (i.e., variants of the same segment of video, one of which may have been edited relative to the original).

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to storage for non-linear video editing.

SUMMARY

In general, in one aspect, a method for presenting a media object to a media editing application includes: mapping a first mount in a local system to a first location in a first type of storage system, the first location including a first representation of the media object; mapping a second mount in the local system to a second location in a second type of file system, the second location including a second representation of the media object that is timecode-aligned with the first representation of the media object, the second representation being different from the first representation; and providing the first mount in the local system and the second mount in the local system to the media editing application, to enable the media editing application to switch between the first representation of the media object and the second representation of the media object via the local system.

The method may further include: receiving, by a media asset manager, the first representation of the media object; generating, by the media asset manager, the second representation of the media object based at least on the first representation of the media object; and storing, by the media asset manager, the second representation of the media object in the second location.

The method may further include: receiving a first uniform resource indicator (URI) indicating the first location of the first representation of the media object in the first type of storage system; and receiving a second URI indicating the second location of the second representation of the media object in the second type of storage system.

The local system may include a Portable Operating System Interface (POSIX) file system and at least one of the first type of storage system and the second type of storage system may be a non-POSIX storage system. The first type of file system may be a block storage system and the second type of file system may be an object storage system. The first representation of the media object may include a high-resolution version of a video clip and the second representation of the media object may include a lower-resolution version of the video clip. The first representation of the media object may include a first video clip of a scene and the second representation of the media object may include a second video clip of the scene, the second video clip including one or more of a different camera location or a different camera angle than the first video clip. The first mount and the second mount may be mounted in a same logical drive of the local system. The first location and the second location may be separate locations in a same storage medium.

In general, in one aspect, a system for presenting a media object to a media editing application includes: a storage service configured to (a) map a first mount in a local system to a first location in a first type of storage system, the first location including a first representation of the media object, and (b) map a second mount in the local system to a second location in a second type of file system, the second location including a second representation of the media object that is timecode-aligned with the first representation of the media object, the second representation being different from the first representation; a media asset manager configured to provide metadata associated with the media object to a software add-on for the media editing application, the metadata indicating at least the first mount in the local system and the second mount in the local system; and the software add-on for the media editing application, configured to provide the first mount in the local system and the second mount in the local system to the media editing application, to enable the media editing application to switch between the first representation of the media object and the second representation of the media object via the local system.

The media asset manager may be further configured to: receive the first representation of the media object; generate the second representation of the media object based at least on the first representation of the media object; and store the second representation of the media object in the second location.

The media asset manager may be further configured to: receive a first uniform resource indicator (URI) indicating the first location of the first representation of the media object in the first type of storage system; and receive a second URI indicating the second location of the second representation of the media object in the second type of storage system.

The software add-on may be a visually integrated add-on component for the media editing application. The local system may include a Portable Operating System Interface (POSIX) file system and at least one of the first type of storage system and the second type of storage system may be a non-POSIX storage system. The first type of file system may be a block storage system and the second type of file system may be an object storage system. The first representation of the media object may include a high-resolution version of a video clip and the second representation of the media object may include a lower-resolution version of the video clip. The first representation of the media object may include a first video clip of a scene and the second representation of the media object may include a second video clip of the scene, the second video clip including one or more of a different camera location or a different camera angle than the first video clip. The first mount and the second mount may be mounted in a same logical drive of the local system. The first location and the second location may be separate locations in a same storage medium.

In general, in one aspect, one or more non-transitory computer-readable media store instruction that, when executed by one or more processors, cause the one or more processors to perform operations including: mapping a first mount in a local system to a first location in a first type of storage system, the first location including a first representation of the media object; mapping a second mount in the local system to a second location in a second type of file system, the second location including a second representation of the media object that is timecode-aligned with the first representation of the media object, the second representation being different from the first representation; and providing the first mount in the local system and the second mount in the local system to the media editing application, to enable the media editing application to switch between the first representation of the media object and the second representation of the media object via the local system.

The operations may further include: receiving, by a media asset manager, the first representation of the media object; generating, by the media asset manager, the second representation of the media object based at least on the first representation of the media object; and storing, by the media asset manager, the second representation of the media object in the second location.

The operations may further include: receiving a first uniform resource indicator (URI) indicating the first location of the first representation of the media object in the first type of storage system; and receiving a second URI indicating the second location of the second representation of the media object in the second type of storage system.

The local system may include a Portable Operating System Interface (POSIX) file system and at least one of the first type of storage system and the second type of storage system may be a non-POSIX storage system. The first type of file system may be a block storage system and the second type of file system may be an object storage system. The first representation of the media object may include a high-resolution version of a video clip and the second representation of the media object may include a lower-resolution version of the video clip. The first representation of the media object may include a first video clip of a scene and the second representation of the media object may include a second video clip of the scene, the second video clip including one or more of a different camera location or a different camera angle than the first video clip. The first mount and the second mount may be mounted in a same logical drive of the local system. The first location and the second location may be separate locations in a same storage medium.

One or more embodiments described in this Specification and/or recited in the claims may not be included in this section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIGS. 3A-3J illustrate an example of heterogeneous media editing across storage platforms according to an embodiment.

DETAILED DESCRIPTION

1. General Overview

Figure 1:
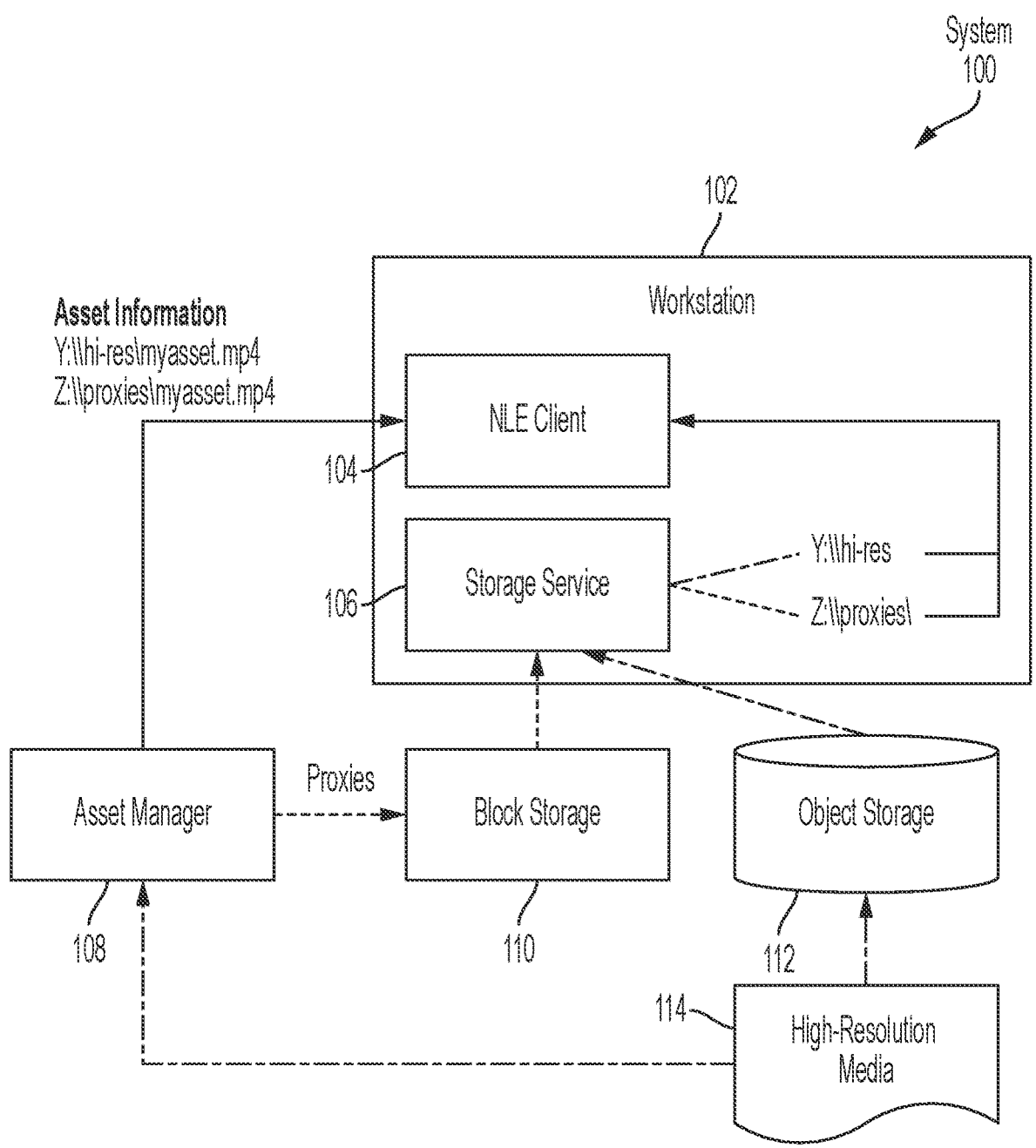
FIG. 1 is a block diagram of an example of a system according to an embodiment.

In general, one or more embodiments include an automated process for instructing a client (e.g., a media editing application) about the association between versions of a media object that are respectively stored using different storage types. As used herein, a "media object" refers to any kind of media that may have different timecode-aligned versions, including but not limited to video and/or audio. A version of a media object may also be referred to herein as a "representation" of the media object. For example, different versions/representations may include a high-resolution original version and a lower-resolution proxy version of a video clip, different video clips that represent a particular scene from different camera angles and/or locations, different versions of a multitrack audio recording that differ in at least one audio track, and/or versions of a media object that differ in one or more other ways.

As used herein, the term "timecode-aligned" means that the content at a given timecode (also referred to as a timestamp) in one version of the media object is temporally aligned with the content at the same timecode in the other version of the media object. For example, given a high-resolution original version of a video clip and a lower-resolution proxy version of the same video clip, each frame at a given timecode in the proxy version is a lower-resolution version of a frame at the same timecode in the original version. As another example, given two videos of the same scene shot from different camera angles, each frame at a given timecode in one version corresponds to a different-angle representation of a corresponding frame at the same timecode in the other version.

A system according to one or more embodiments includes a storage service that presents a local file system to the client. The local file system may be a standard file system (e.g., a POSIX file system), even though the backend storage for the local file system may include a blend of storage types. In examples described herein, the client is a non-linear video editing (NLE) client. However, one or more embodiments may service a different kind of client (e.g., audio processing, visual effects, computer-aided design, and/or another kind of client). In addition, in the following discussion, the storage types include object storage and block storage. However, one or more embodiments may use one or more other types of storage (e.g., local and/or remote file storage, a database, and/or another type of storage or combination thereof). For video editing purposes specifically, embodiments should not be considered limited to storing high-resolution media in object storage and/or proxy files on block storage. Any other combination of storage types may be used that provides appropriate latency for editing. For example, some or all of the proxy files may also be stored in object storage and/or another type of storage other than block storage.

In an embodiment, a system stores high-resolution media (e.g., video) on object storage and a low-resolution version (which may be referred to as a "proxy" version) on block storage. The system presents these locations as a single asset/clip to the client. The client may be able to use media toggling features (e.g., to toggle between high-resolution and low-resolution versions) without needing to understand the object storage location that is hidden by the storage service.

One more embodiments help alleviate uncertainties and roadblocks involved in proxy editing. Techniques and components described herein include an integrated, automated, and seamless approach to editing a media object having multiple representations. One or more embodiments do not require the user to know the locations of different files and/or objects corresponding to the different representations of the media object and/or which file corresponds to each respective representation. The user may also not be required to manually instruct the media editing application as to which file corresponds to which representation of the media object. One or more embodiments may: (1) automate a desirable distribution of media assets across object and block storage, including automated upload of new original content directly into object storage and exposing the content via a standard (e.g., POSIX) interface; (2) automate proxy creation and placement of proxies on block storage; (3) present a unified file system view to NLE clients that provides access to proxy and original high-resolution content (generally stored on block and object, respectively); and/or (4) communicate with NLE applications so that when media clips are added to an NLE project, the NLE application understands that the proxy and high-resolution assets are versions of the same clips.

One or more embodiments include a storage service that presents both object and block storage to video editing clients as a standard native file system. For example, the file system may appear as a mounted volume on MacOS (e.g., /Volumes/MediaSpace) or a standard drive on Windows (e.g., Z:/ drive). Using this approach, NLE clients are not required to understand the semantics of the specific object or block storage technology and may utilize files on either type of storage, via the file system exposed by the storage service.

In an embodiment, video material is uploaded in high-resolution to an object storage location. Uploading the original to object storage may allow the media to be stored at lower cost and take advantage of cost-saving features such as intelligent tiering (e.g., AWS S3 Intelligent-Tiering) that can move infrequently-accessed media to even lower cost (but slower) storage. With media uploaded to the object storage, an automated service may scan the media and generate a lower-resolution "proxy" file by transcoding the media into a lower bitrate common format that is appropriate for video editing (e.g., an MPEG-4 format, MXF OP1a, or MXF OP-Atom format). The system may place the proxy file onto high speed storage (e.g., block storage). A proxy file in high speed storage may be retrieved with low latency either directly or, for example, using a clustered file system spanning multiple block stores.

In an embodiment, both locations for the asset are stored within a metadata store and associated with the same asset. When the asset is imported into an NLE client, both locations may be provided in a clip that allows the editor to switch between the proxy version and the high-resolution version. The proxy file may be used by default. Both locations may be mapped to a local storage location that is being mapped by the storage service.

The storage service may map the object storage location and the block storage location as different drives/volumes on the client machine. For example, drive Y:/ may map to object storage and drive Z:/ may map to block storage. In this example, a clip may be presented to the NLE client with two locations: a proxy location at Z:/proxies/mymedia.mxf and a high-resolution location at Y://hi-res/mymedia.mxf. Alternatively, the storage service may map the object storage and block storage to different locations in the same local volume. For example, the location Z:/hi-res/ may map to object storage and the location Z:/proxies/ may map to block storage.

In an embodiment, the storage service may manage one or more of: (1) local file system locations mapped to object storage locations (e.g., uniform resource locators (URIs)); (2) local file system locations mapped to file system gateway locations that, in turn, are mapped (e.g., by the file system gateway or based on asset metadata) to object storage locations; and/or (3) local file system locations mapped to the locations of proxy files in block storage and/or another type of storage. In general, the storage service may be configured to manage many different kinds of heterogeneous storage mappings that are presented to the NLE client as a homogeneous local file system, without requiring the NLE client to understand the details of the underlying storage systems.

The storage service may use a variety of techniques to identify the true locations of files. For example, the storage service may use "sparse files." Sparse files appear within file system listings as standard files (with known attributes such as size, etc.) but have no contents on disk. Metadata associated with a sparse file provides the object storage location (e.g., s3://mybucket/mymedia.mxf) and the storage service may utilize this metadata to identify that the file should not be read from the block storage location but rather from object storage (e.g., via the corresponding object storage service programming interface (API) and/or using the corresponding uniform resource identifier (URI) for the object).

Prefetching and Local Caching

One or more embodiments include prefetching techniques to reduce latency associated with object storage. Based on information about the proxy media in use by the NLE client, it may be possible to determine when the storage service should prefetch some of the high-resolution media from the object storage, to allow for rapid toggling for media types. Prefetching may be based on observed behavior of the NLE client. For example, the storage service may execute a byte-range query against object storage, based on a byte range of the proxy media that is currently in use. Alternatively or additionally, the storage service may begin prefetching high-resolution media responsive to the corresponding low-resolution media being imported into a project. Alternatively or additionally, prefetching may be based on heuristics and/or other analytical techniques that predict which high-resolution media is most likely to be requested. The storage service may learn from user behavior over time. For example, the storage service may determine that the user is most likely to request high-resolution media at the beginning, end, or other segment of a video clip. One or more prefetching parameters may be user-configurable. For example, a user may specify a maximum or minimum segment length and/or data size to prefetch. Alternatively or additionally, one or more prefetching parameters may be configurable (by an automated process and/or based on user input) based on available system resources, such as available local disk space, memory, bandwidth, etc.

In some cases, even when using prefetching, high-resolution media may not be available locally at the time the NLE client requests it (e.g., using media toggling). For example, the storage service may not have prefetched that particular high-resolution segment and/or the object storage may be experiencing high latency that slows the prefetching process. In such cases, the storage service may continue to serve the lower-resolution proxy file in lieu of the high-resolution media. However, even while serving the lower-resolution proxy file, the storage service may prefetch high-resolution material ahead of the currently requested range.

One or more prefetching techniques described herein with respect to high-resolution media may be applied to lower-resolution proxy media. In general, prefetching may apply to any type of media and/or metadata that would otherwise be stored "in the cloud" (i.e., cloud-based object storage, block storage, and/or another kind of storage). In addition, because the storage system tracks multiple versions of the same media (and, optionally, redundant copies of the same versions in different locations), if the storage service does not have access to one form of storage, it may alternatively fetch media from another available storage location. For example, if the storage service is unable to access the block storage location of a proxy file, it may instead fetch an alternative object storage location of the proxy file, as a slower backup alternative.

The storage service may be operatively connected to a software add-on in an NLE client. The software add-on may include a "panel," i.e., a defined area of the NLE's user interface that provides a third-party functionality to the NLE client. For example, the EditShare FLOW suite includes an Adobe Premiere Pro panel. Continuing with the example of FLOW, the FLOW panel may be capable of connecting to a FLOW instance locally. (In an "all-cloud" configuration, the NLE client is hosted in the cloud and accessed via remote desktop.) The FLOW panel may also be capable of connecting to a remote FLOW instance, where the NLE client and panel are executing at a user's workstation and connecting to a remote FLOW instance (e.g., cloud-hosted, executing in a server in the local network, or otherwise remote with respect to the user's workstation). The panel may be configured to pull down local copies of high-resolution media and/or lower-resolution proxy files, in order to work with local copies of the media. Files that the panel caches locally may originate, for example, in AWS S3. The panel may be configured to inspect which proxy files have been loaded into an NLE project or sequence and initiate a process for prefetching the corresponding high-resolution media. To do so, the panel may rapidly "scrub" through a project or sequence timeline to determine which proxy files were requested for inclusion in the timeline. The panel may emulate playback requests to the storage service for the high-resolution media. For efficiency and performance, the panel may focus on material currently being accessed by the user and make requests to the storage service to retrieve high-resolution versions of the video that is proximal in the timeline. The panel may be configured to initiate prefetching only for media that is in a visible video layer. Techniques described herein with respect to a "panel" may alternatively or additionally be performed by a non-panel add-on to the NLE client and/or within the NLE client's own code. Embodiments should not be considered limited to panel-based implementations.

Machine Learning

In an embodiment, a machine learning engine trains a machine learning model to perform one or more operations, e.g., determining which media to prefetch (i.e., one or more segments and/or an entire media file) and/or when to prefetch it. Training a machine learning model uses training data (e.g., log data from media editing sessions providing information about user behavior over the course of the editing sessions, including instances of toggling between versions of a media object) to generate a function that, given one or more inputs to the machine learning model, computes a corresponding output (e.g., given data describing a current state of a media editing application, which media to prefetch in anticipation of toggling). The output may correspond to a prediction based on prior machine learning. In an embodiment, the output includes a label, classification, and/or categorization assigned to the provided input(s). The machine learning model corresponds to a learned model for performing the desired operation(s) (e.g., labeling, classifying, and/or categorizing inputs). A system may use multiple machine learning engines and/or multiple machine learning models for different purposes.

In an embodiment, the machine learning engine may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. For example, labeled training data may include NLE client usage information. The NLE client usage information may include, for example, information about user requests for high-resolution media (e.g., information about times when media toggling was used). Alternatively or additionally, machine learning may identify different access patterns, based on one or more end user workflows. For example, an editing workflow may tend to require media from many different layers in a timeline to be available at high resolution infrequently, and/or a color grading workflow may require high resolution material for only the visible layers. Workflow-specific learning may allow the user to switch/adjust the precaching experience by selecting a differently-trained model, based on the user's current workflow. For example, if the user switches from an editing workflow to a color grading workflow, the system may adjust its learned prefetching techniques accordingly (and may apply any ongoing unsupervised learning to the appropriate workflow-specific model).

In semi-supervised learning, some inputs are associated with supervisory signals and other inputs are not associated with supervisory signals. In unsupervised learning, the training data does not include supervisory signals. Reinforcement learning uses a feedback system in which the machine learning engine receives positive and/or negative reinforcement in the process of attempting to solve a particular problem (e.g., to optimize performance in a particular scenario, according to one or more predefined performance criteria). In an embodiment, the machine learning engine initially uses supervised learning to train the machine learning model and then uses unsupervised learning to update the machine learning model on an ongoing basis.

In an embodiment, a machine learning engine may use many different techniques to label, classify, and/or categorize inputs. A machine learning engine may transform inputs into feature vectors that describe one or more properties ("features") of the inputs. The machine learning engine may label, classify, and/or categorize the inputs based on the feature vectors. Alternatively or additionally, a machine learning engine may use clustering (also referred to as cluster analysis) to identify commonalities in the inputs. The machine learning engine may group (i.e., cluster) the inputs based on those commonalities. The machine learning engine may use hierarchical clustering, k-means clustering, and/or another clustering method or combination thereof. In an embodiment, a machine learning engine includes an artificial neural network. An artificial neural network includes multiple nodes (also referred to as artificial neurons) and edges between nodes. Edges may be associated with corresponding weights that represent the strengths of connections between nodes, which the machine learning engine adjusts as machine learning proceeds. Alternatively or additionally, a machine learning engine may include a support vector machine. A support vector machine represents inputs as vectors. The machine learning engine may label, classify, and/or categorizes inputs based on the vectors. Alternatively or additionally, the machine learning engine may use a naïve Bayes classifier to label, classify, and/or categorize inputs. Alternatively or additionally, given a particular input, a machine learning model may apply a decision tree to predict an output for the given input. Alternatively or additionally, a machine learning engine may apply fuzzy logic in situations where labeling, classifying, and/or categorizing an input among a fixed set of mutually exclusive options is impossible or impractical. The aforementioned machine learning model and techniques are discussed for exemplary purposes only and should not be construed as limiting one or more embodiments.

2. System Architecture

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, the system 100 includes a workstation 102. The workstation 102 is configured to execute a non-linear video editing (NLE) client 104, which accesses video media via a storage service 106. The storage service 106 is configured to provide access to both high-resolution media 114 (in this example, via object storage 112) and a lower-resolution version of the same media (in this example, via block storage 110). An asset manager 108 is configured to generate proxies based on high-resolution media 114 and write the proxies to the block storage 110.

Alternatively, the asset manager 108 may be configured to obtain uniform resource indicators (URIs) indicating the locations of both high-resolution and lower-resolution versions, without needing to generate the lower-resolution proxy. In addition, the asset manager 108 is configured to transmit asset information (metadata associated with the media object) to the NLE client 104. The asset information indicates, for example, the file paths or uniform resource indicators (URIs) where the storage service 106 makes the different media versions available to the NLE client 104. In this example, alternating long and short dashes correspond to paths followed by high-resolution media 114 through the system 100. Short dashes correspond to paths followed by lower-resolution proxies through the system 100. As noted above, the storage service 106 may supply either or both media versions to the NLE client 104.

In an embodiment, the storage service 106 generates and manages one or more data structures (not shown) that include (a) the locations of versions of media files and (b) the correspondences between the different versions across heterogeneous storage types (e.g., correspondences between high-resolution media in object storage and lower-resolution proxy files in block storage). The storage service 106 also includes an application programming interface (API) that presents as a homogeneous file system. When the storage service 106 receives a request for media via the API, the storage service 106 accesses the data structure(s) to determine where to access the data needed to service the request.

In an embodiment, the workstation 102 resides in a remote location, such as a cloud service. An end user may access the workstation 102 via a remote desktop application (e.g., Microsoft Remote Desktop, Teradici, Nice DCV, Teamviewer, and/or another remote access application), using a client computer system (not shown). The remote workstation 102 may be configured to provide access to virtualized hardware and/or software infrastructure, via remote access. Alternatively, the end user may access and use the workstation 102 directly. The block storage 110 and object storage 112 may be hosted in an environment that is local to the workstation 102 or in a location that is remote to both the client computer system and the workstation 102.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In an embodiment, one or more components of the system 100 provide a user interface (not shown). A user interface refers to hardware and/or software configured to facilitate communications between a user and a system component. A user interface renders user interface elements and receives input via user interface elements. A user interface may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms.

In an embodiment, different components of a user interface are specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface may be specified in one or more other languages, such as Java, Python, Perl, C, C++, and/or any other language or combination thereof.

3. Operations for Heterogeneous Media Editing Across Storage Platforms

Figure 2A:
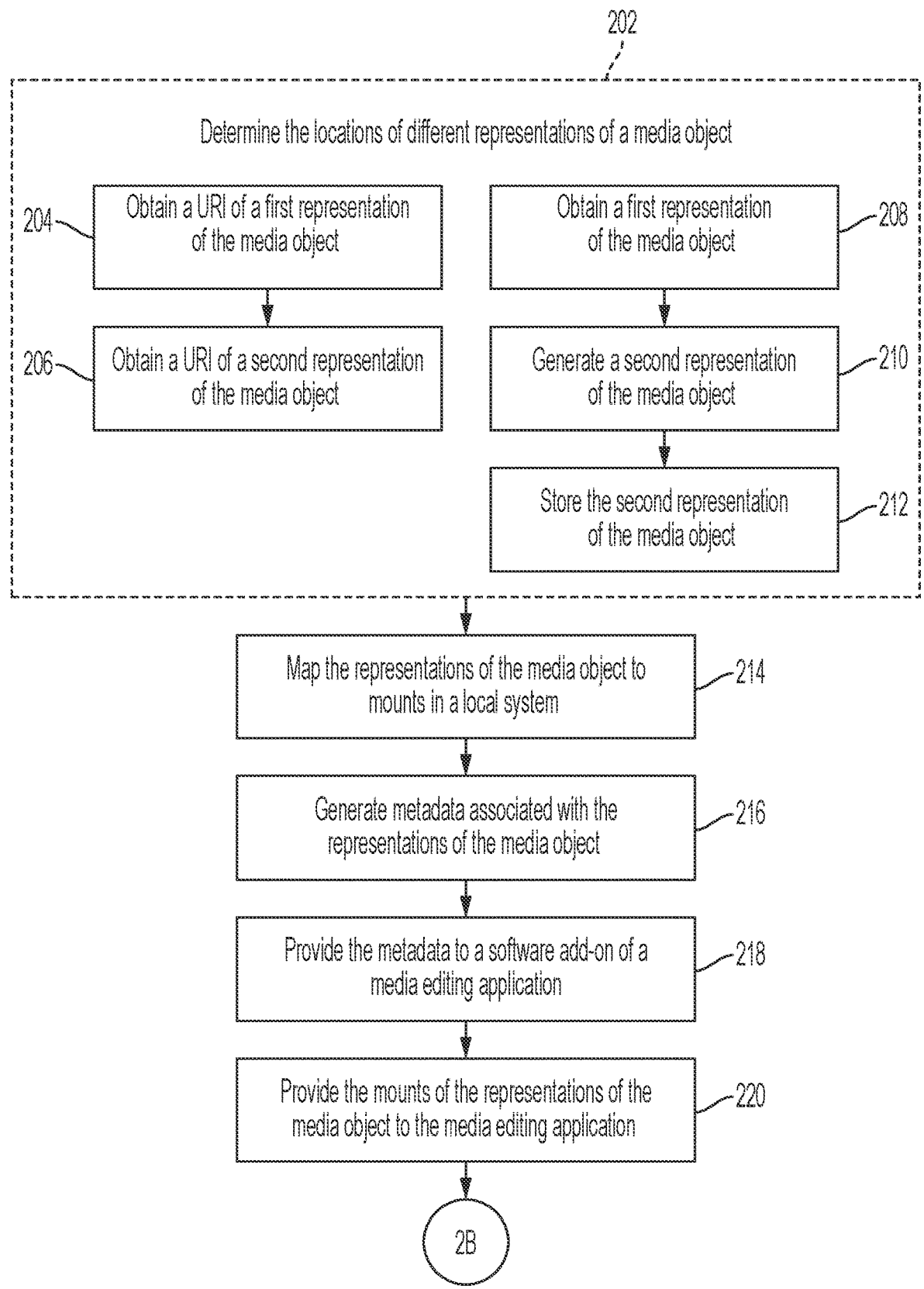
FIGS. 2A-2B are a flow diagram of an example of operations for heterogeneous media editing across storage platforms according to an embodiment.
Figure 2B:
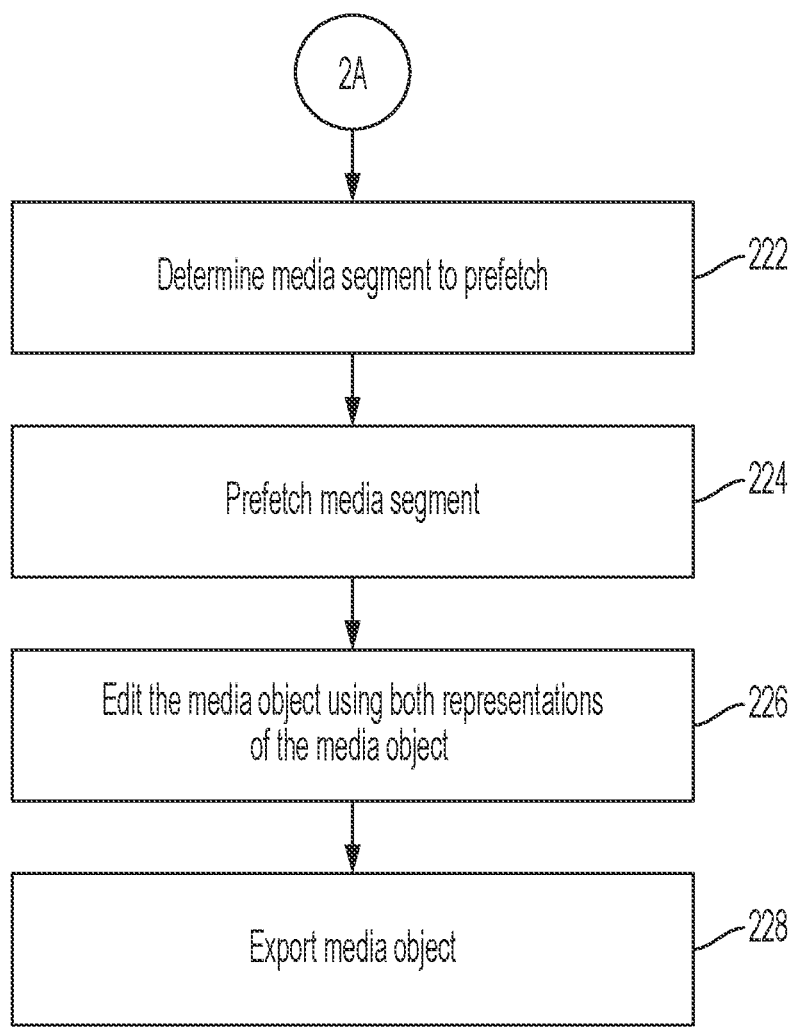

FIGS. 2A-2B are a flow diagram of an example of operations for heterogeneous media editing across storage platforms according to an embodiment. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

One or more operations described below may be performed by an asset manager (e.g., as illustrated in FIG. 1), a storage service (e.g., as illustrated in FIG. 1), and/or a software add-on of a media editing application (e.g., an NLE client as illustrated in FIG. 1). The specific allocation of operations between different components of a system may vary from one implementation to the next. For ease of discussion, operations are referred to below as being performed by a "system."

In an embodiment, the system determines the locations of two different representations of a media object (Operation 202). The system may determine the locations in various ways. For example, both representations may already exist and the system may obtain uniform resource indicators (URIs) indicating the locations of the existing representations (Operations 204 and 206). Alternatively, only one representation of the media object may initially exist. For example, an original high-resolution video clip may exist, but a lower-resolution proxy may not yet exist. The system may obtain a first representation of the media object (Operation 208). For example, the system may obtain a high-resolution original video clip from object-based storage. The system may generate a second representation of the media object (Operation 210), e.g., the lower-resolution proxy. The system may store the second representation of the media object (212) in a location designated for such representations. For example, the system may store lower-resolution proxies in low-latency block storage.

Based at least on the locations of the different representations of the media object, the system maps the representations to mounts in a local system (Operation 214). For example, as described above, the system may map an object storage location and a block storage location as different drives/volumes on the client machine, or different locations in the same local volume.

The system generates metadata associated with the representations of the media object (Operation 216). The metadata indicates at least the local mount locations and may include other information associated with the media object and/or representation thereof. The system provides the metadata to a software add-on of a media editing application (Operation 218). For example, as described below, the system may provide the metadata to a panel add-on to an NLE client. The system provides the mounts (e.g., by providing URIs of the mounts) to the media editing application (Operation 220). Via the mounts, the media editing application can then access the different representations of the media object.

As discussed above, prefetching may allow for faster toggling between different representations of a media object. The system may determine a media segment (i.e., a part or whole of one of the representations) to prefetch (Operation 222). As further discussed above, determining a media segment to prefetch may be based on machine learning that learns from prior behavior of users of the media editing application, to generate a machine learning model that can predict which media segment to prefetch based on a current application state. Alternatively or additionally, determining which media segment to prefetch may be based on a byte range of proxy media that is currently in use, which lower-resolution media is being imported into a project, heuristics and/or other analytical techniques that predict which high-resolution media is most likely to be requested. Prefetching techniques may learn from user behavior over time with or without machine learning. For example, the storage service may determine that the user is most likely to request high-resolution media at the beginning, end, or other segment of a video clip. The system may determine which media segment to prefetch based on one or more prefetching parameters, such as a maximum or minimum segment length and/or data size to prefetch and/or available system resources (e.g., available local disk space, memory, bandwidth, etc.). The system then prefetches the media segment (Operation 224) to support faster toggling between representations of the media object.

Techniques described herein allow for editing the media object using both representations of the media object (Operation 226), without the media editing application needing to understand the backend storage platforms where the different representations are stored. The media editing application may work with the different versions (e.g., editing and/or toggling between the different versions) as if they both were stored locally, even if they are actually stored on different storage platforms. A user may instruct the system to export the media object (Operation 228), including any edits the user may have made. In the case of a high-resolution original and a lower-resolution proxy, the system may export a high-resolution representation that includes edits made using the lower-resolution proxy.

4. Detailed Example

A detailed example is described below for purposes of clarity. Components and/or operations described below should be understood as examples that may not be applicable to one or more embodiments. Accordingly, components and/or operations described below should not be construed as limiting the scope of one or more embodiments.

Figure 3A:
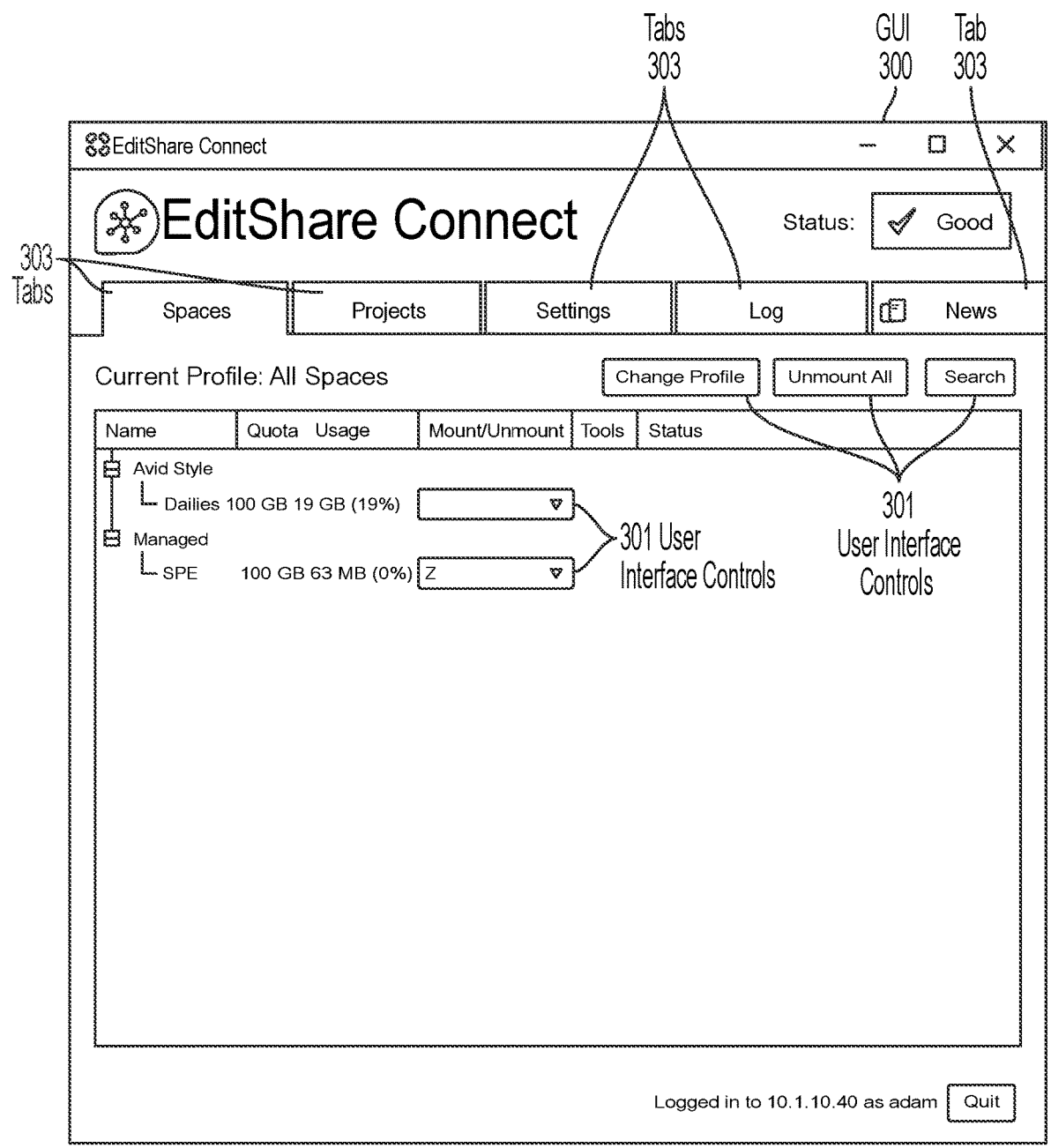

FIGS. 3A-3J illustrate an example of heterogeneous media editing across storage platforms according to an embodiment. As illustrated in FIG. 3A, a graphical user interface (GUI) 300 includes user interface controls (e.g., user interface controls 301), over multiple interface tabs or pages 303, for managing mounts and other configurations for media editing. In this example, despite being accessible to the local system as a single drive, the managed drive Z: includes a mixture of block and object storage from different storage platforms. Specifically, in this example, the media objects to be edited are video clips, with high-resolution versions stored in object storage and lower-resolution proxies stored in block storage. FIG. 3B illustrates a listing of high-resolution video clips 302 stored in an Amazon S3 bucket. The URI of this bucket is mounted to a folder under Z: on the local system, which in this example is a Microsoft Windows® computer. Specifically, FIG. 3C illustrates that the URI of the high-resolution representations is mapped to the mounted folder 304 "Z:\Adobe_High_Resolution_Files." Via the mount, files stored in the bucket are accessible to Windows File Manager on the local system. Mounting a folder that provides access to object storage in this manner avoids the cost of maintaining sufficient block storage to accommodate all the high-resolution originals. Because the local system is not required to store a full, high-resolution representation of each video clip (or other kind of media object), the local system does not require as much local storage capacity. Therefore, the local system's functional capabilities are expanded beyond what would be possible if the local system were required to store all representations of the media object locally.

In this example, after high-resolution originals are imported into object storage, EditShare FLOW automatically scans the media objects, generates corresponding lower-resolution proxies, and stores the proxies in a separate, lower-latency block storage location that is hidden from the user. For example, the proxies may be stored in a separate root-level mounted folder, "Z:\.flow_proxies," not shown. The URI of the lower-resolution proxies is mapped to the separate folder, which appears as the same kind of folder to the local system.

Figure 3D:
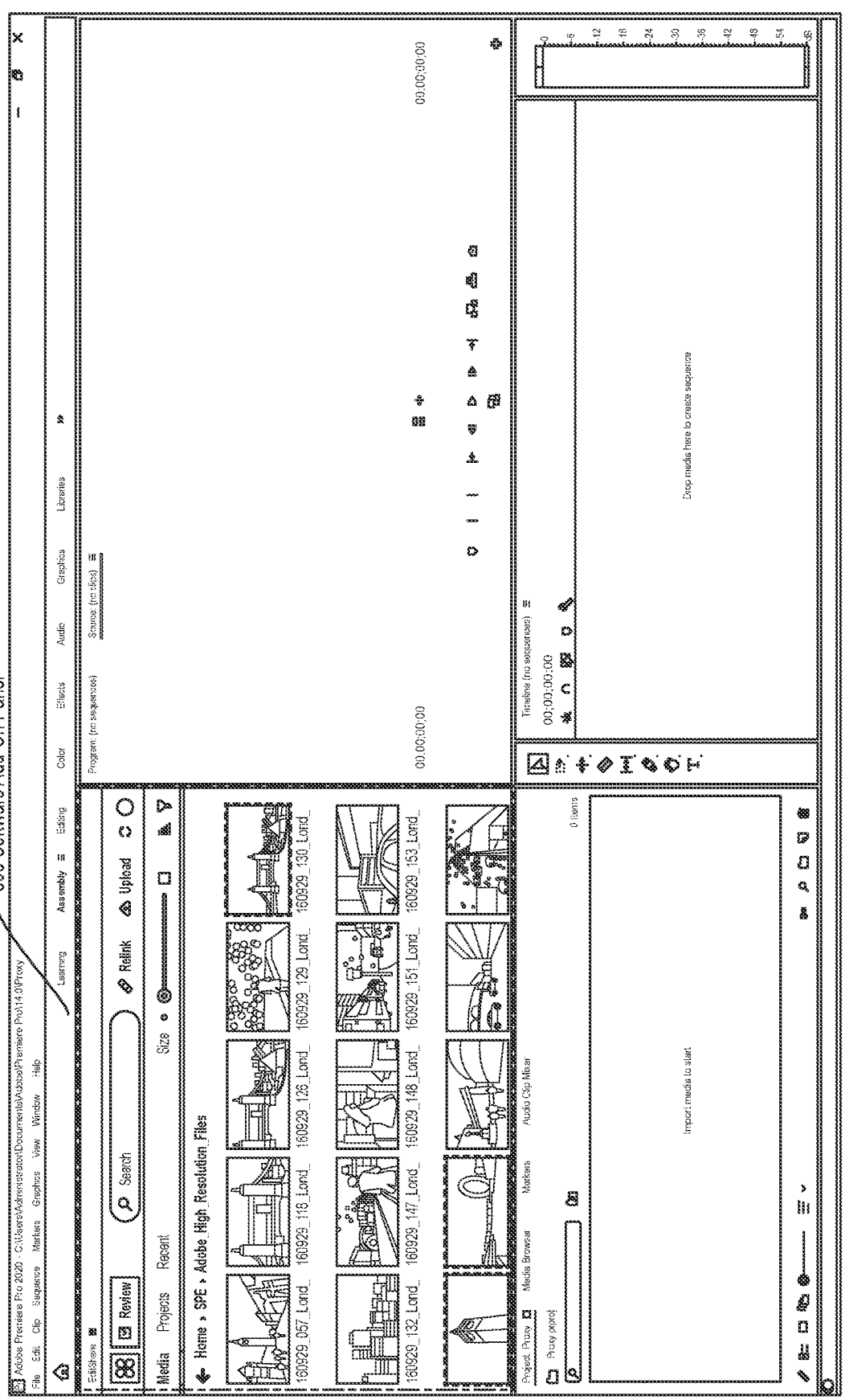
Figure 3E:
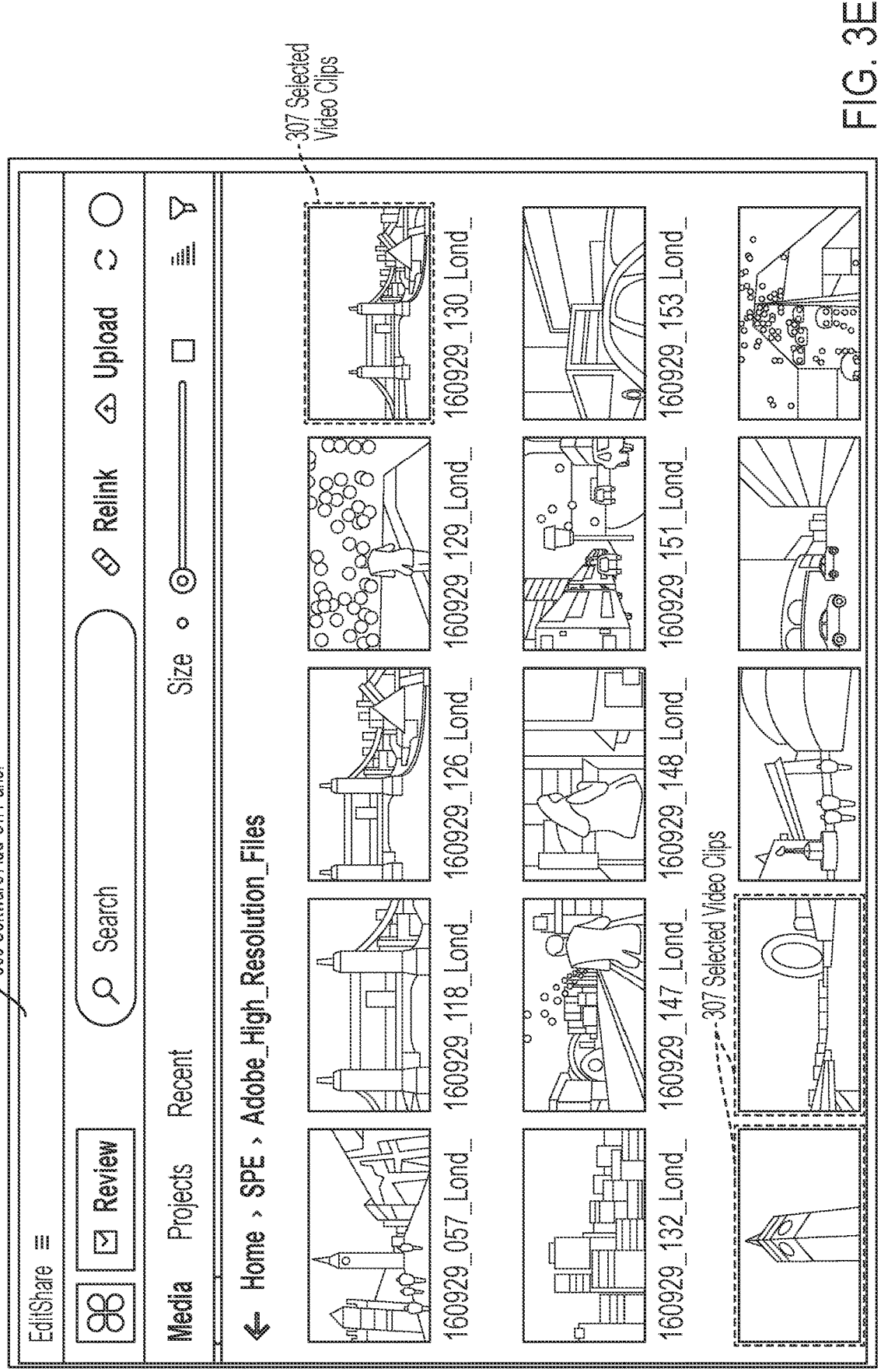
Figure 3F:
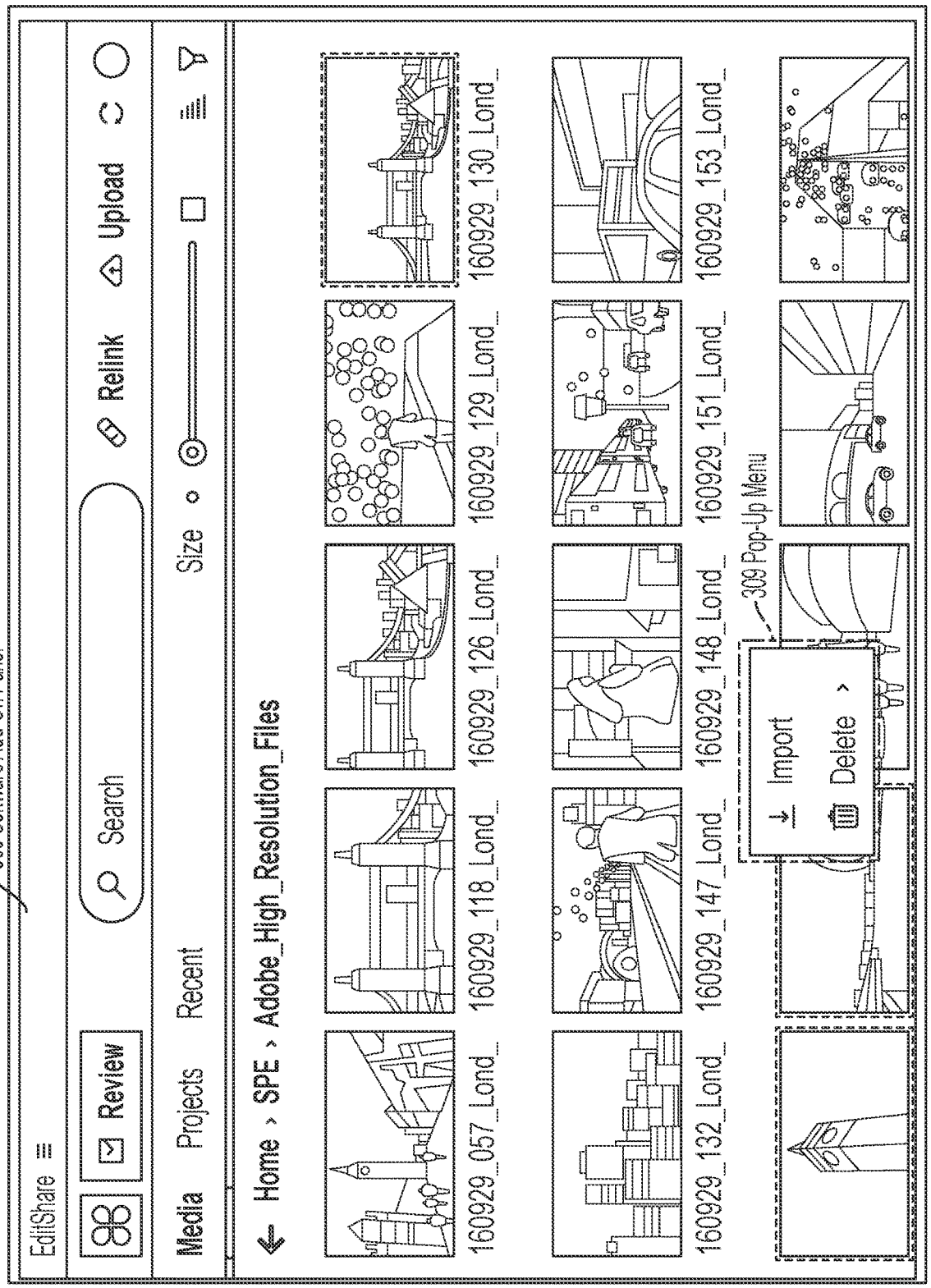

In this example, for illustrative purposes, video editing is performed using Adobe Premiere Pro®. Alternatively, techniques described herein may be adapted for use with DaVinci Resolve, Avid Media Composer, Final Cut Pro, HitFilm, Vegas Pro, and/or another NLE or other type of media editing application. The system includes a software add-on panel 306 that integrates with Premiere Pro. The add-on panel 306 includes an interface showing which video clips in the storage system, which may include locations mapped to multiple drives (i.e., not only Z:), are available to edit. In FIG. 3D, fifteen video clips are illustrated, although more may be available upon scrolling down and/or sideways in the interface. In FIG. 3E, focusing more closely on the add-on panel 306, three of the available video clips 307 are highlighted responsive to being selected by a user. In FIG. 3F, the add-on panel 306 includes a pop-up menu 309 for managing the selected video clips. In this example, options include importing the selected video clips for editing or deleting the selected video clips. Deleting a video clip may only remove the clip from the interface or may also remove the clip from the underlying storage locations; how deletes are handled may be user-configurable.

Figure 3H:
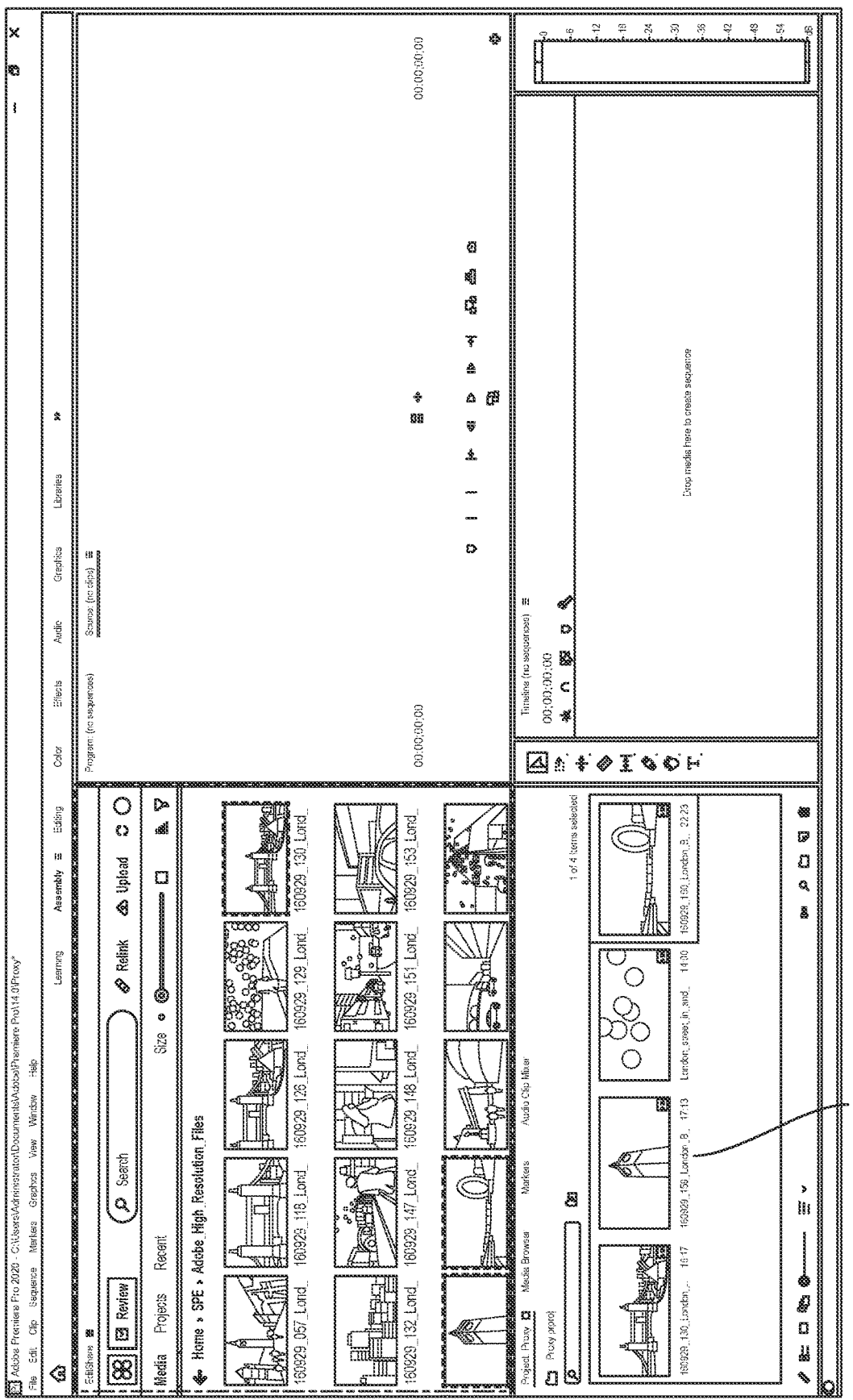
Figure 3I:
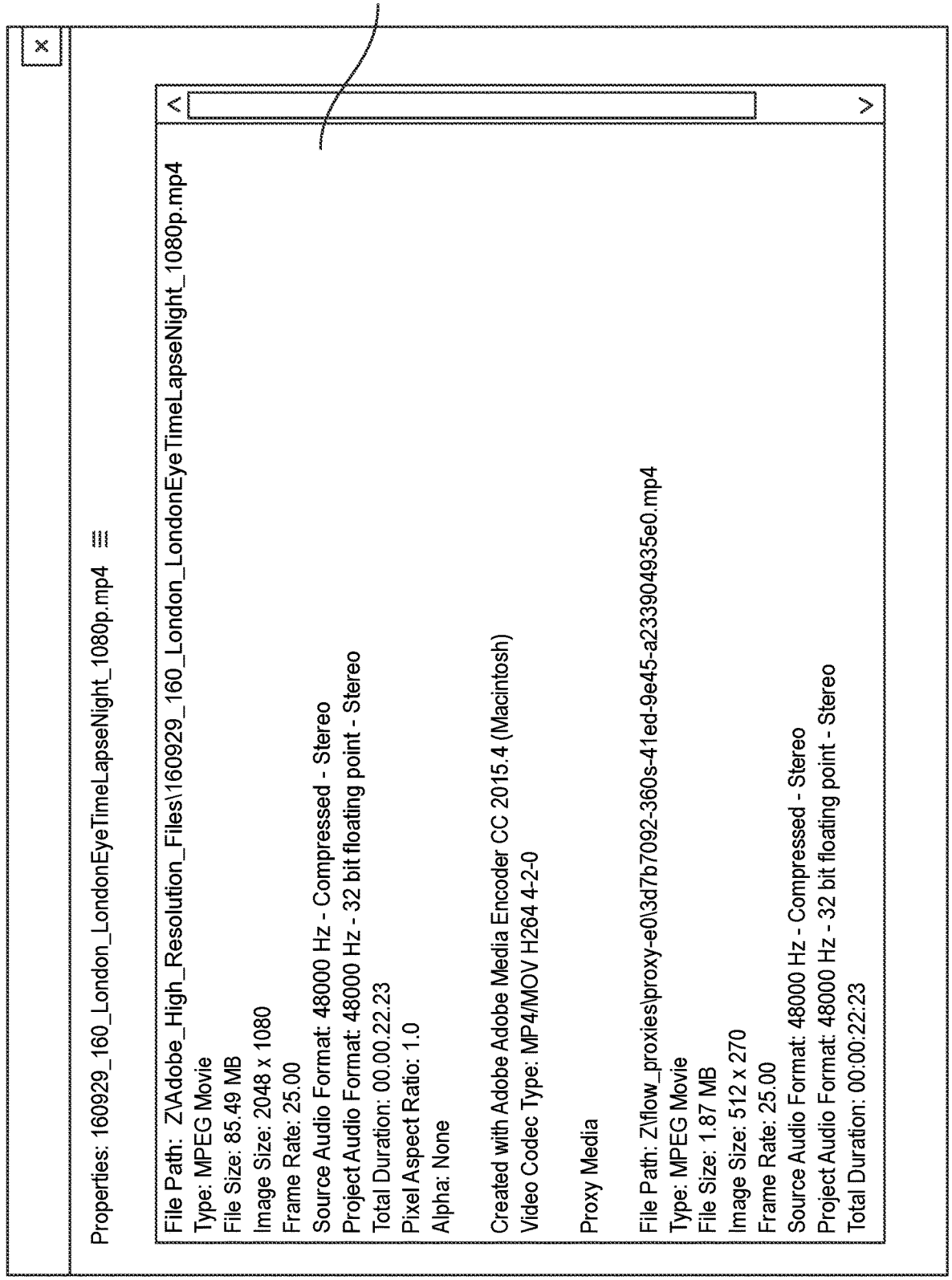

Responsive to user input to import the selected video clips, the add-on panel 306 presents an import manager 308 illustrated in FIG. 3G. The import manager 308 is an interface that provides details about the selected video clips, including information about the original high-resolution video clips and associated lower-resolution proxies. In this example, the proxies already exist; in other examples, proxies may be generated and written to block storage and/or the user's local file system when the originals are imported via the import manager 308. Importing the video clips provides Premiere Pro with information about both the high-resolution originals and lower-resolution proxies, without Premiere Pro needing to know anything about the different underlying storage platforms. Premiere Pro is able to access the different representations of the media object, via the mounts, as if they were files stored in the local system. In FIG. 3H, the imported video clips 310 are now editable using Premiere Pro's native functions. As illustrated in FIG. 3I, viewing a clip's properties 312 in Premiere Pro shows that there are two underlying representations: the high-resolution original and the lower-resolution proxy. Even though the two representations are stored in separate underlying storage platforms, Premiere Pro sees them as files in the local system.

Figure 3J:
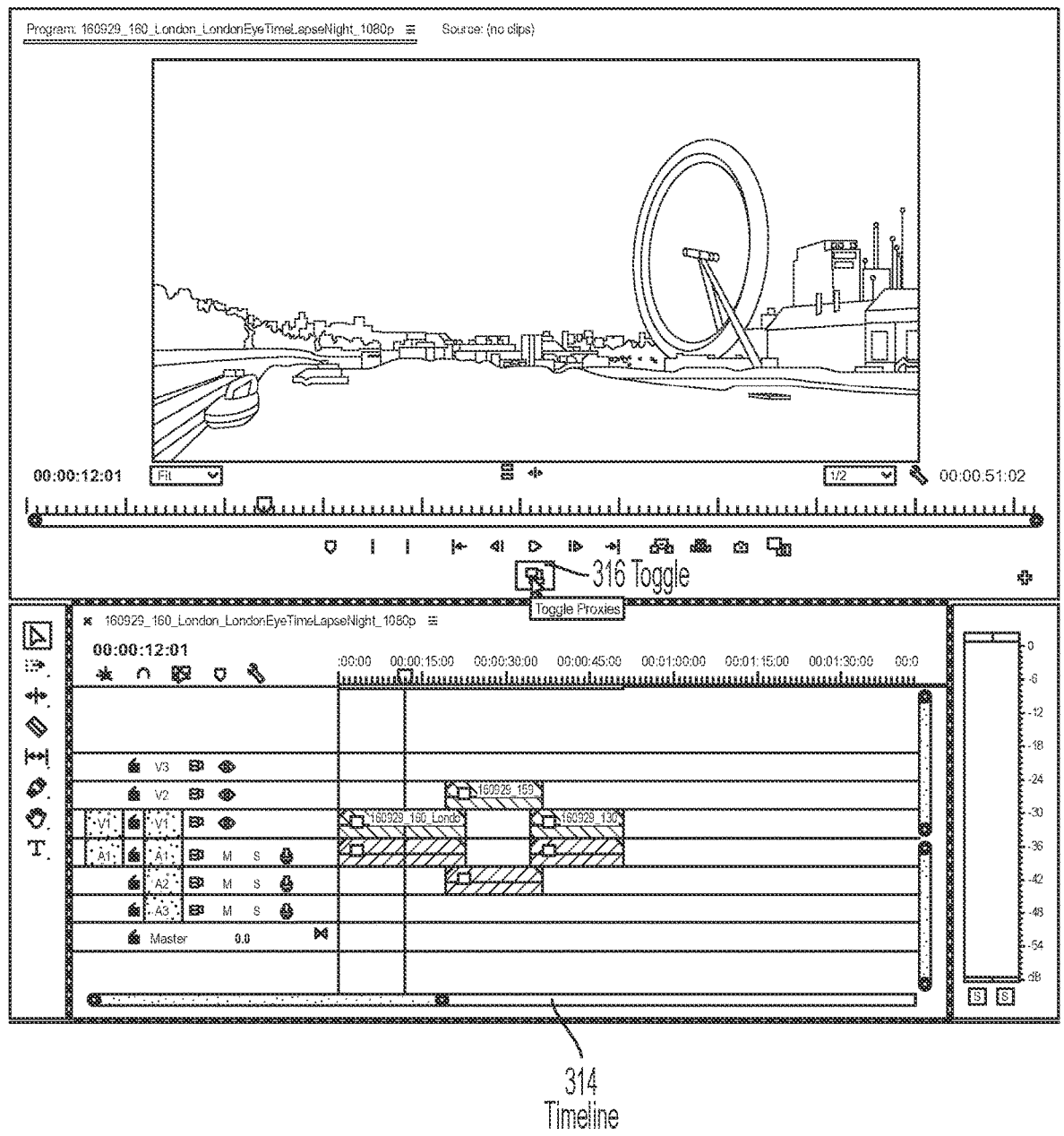

Now that the video clips are imported, a user can proceed to edit them, as illustrated in FIG. 3J. Premiere Pro's timeline 314 shows the timecode-aligned high-resolution originals and lower-resolution proxies. Using Premier's built-in proxy toggle 316, a user can toggle between the different representation of the media object. For example, the user may perform most editing using the lower-latency proxies, then toggle to the higher-resolution originals, for example to verify that a shot is in focus. When ready, the user can export the edited video product from Premiere Pro using the high-resolution originals. This export may be performed offline and, as such, not be sensitive to latencies required during real-time editing.

5. Miscellaneous; Computer Systems; Networks

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 4:
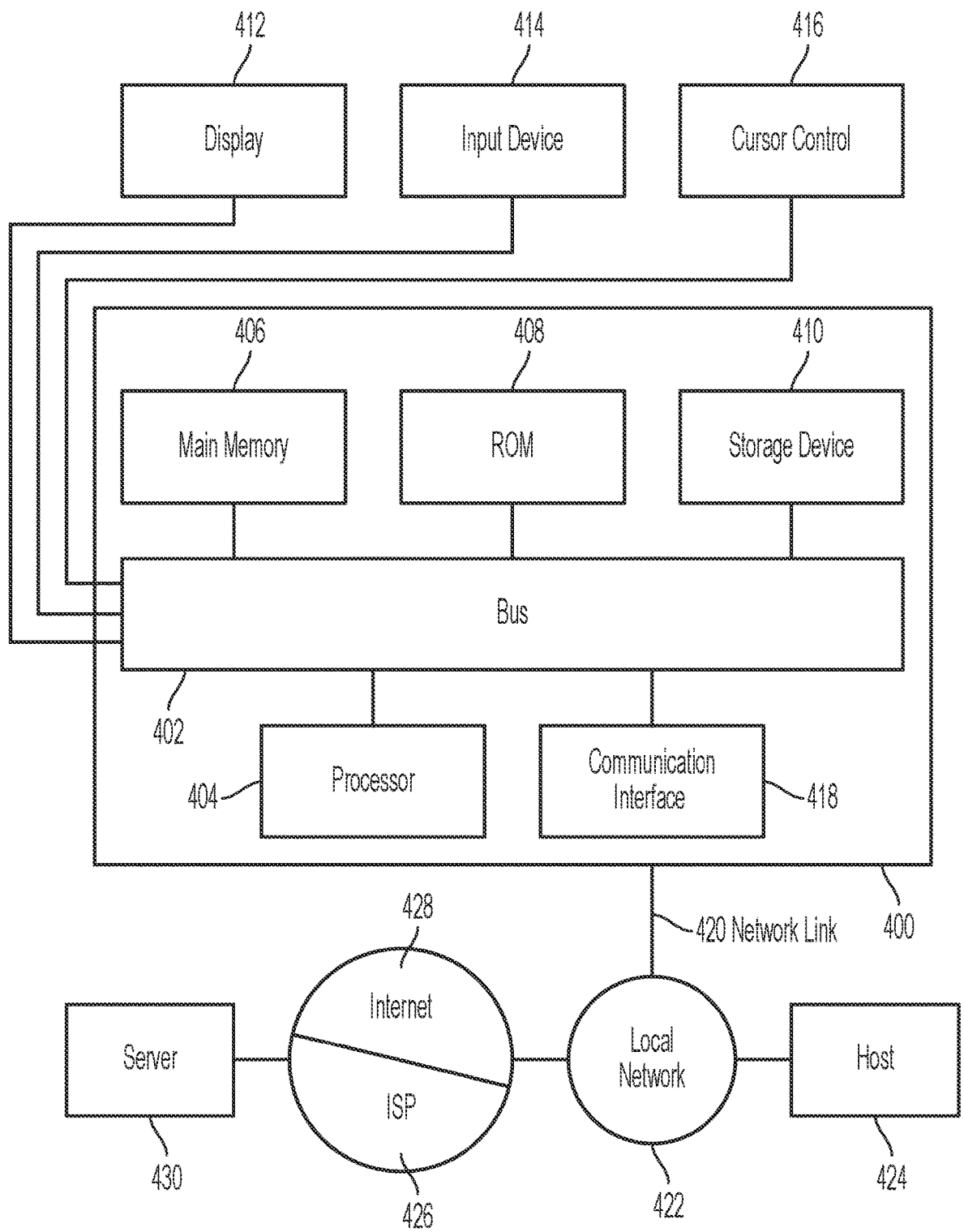
FIG. 4 is a block diagram of an example of a computer system according to an embodiment.

For example, FIG. 4 is a block diagram of an example of a computer system 400 according to an embodiment. Computer system 400 includes a bus 402 or other communication mechanism for communicating information, and a hardware processor 404 coupled with the bus 402 for processing information. Hardware processor 404 may be a general-purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in one or more non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a liquid crystal display (LCD), plasma display, electronic ink display, cathode ray tube (CRT) monitor, or any other kind of device for displaying information to a computer user. An input device 414, including alphanumeric and other keys, may be coupled to bus 402 for communicating information and command selections to processor 404. Alternatively or additionally, computer system 400 may receive user input via a cursor control 416, such as a mouse, a trackball, a trackpad, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. Alternatively or additionally, computer system 4 may include a touchscreen. Display 412 may be configured to receive user input via one or more pressure-sensitive sensors, multi-touch sensors, and/or gesture sensors. Alternatively or additionally, computer system 400 may receive user input via a microphone, video camera, and/or some other kind of user input device (not shown).

Computer system 400 may implement the techniques described herein using customized hard-wired logic, one or more ASICs or FPGAs, firmware, and/or program logic which in combination with other components of computer system 400 causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 402. Transmission media may also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 400 may receive the data from the network and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422, and communication interface 418.

The received code may be executed by processor 404 as it is received, and/or stored in storage device 410, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant IDs. Additionally or alternatively, data structures and/or datasets, stored by the computer network, are tagged with tenant IDs. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. A method for presenting a media object to a media editing application, comprising:
mapping a first mount in a local file system to a first location in a first type of storage service, the first location comprising a first representation of the media object;

mapping a second mount in the local file system to a second location in a second type of storage service, the second location comprising a second representation of the media object that is timecode-aligned with the first representation of the media object, the second representation being different from the first representation; and providing the first mount in the local file system and the second mount in the local file system to the media editing application to enable the media editing application to switch between the first representation of the media object and the second representation of the media object via the local file system.

2. The method of claim 1, further comprising:
receiving, by a media asset manager, the first representation of the media object;
generating, by the media asset manager, the second representation of the media object based at least on the first representation of the media object; and
storing, by the media asset manager, the second representation of the media object in the second location.

3. The method of claim 1, further comprising:
receiving a first uniform resource indicator (URI) indicating the first location of the first representation of the media object in the first type of storage service; and
receiving a second URI indicating the second location of the second representation of the media object in the second type of storage service.

4. The method of claim 1, the local file system comprising a Portable Operating System Interface (POSIX) file system and at least one of the first type of storage service and the second type of storage service being a non-POSIX storage service.

5. The method of claim 4, the first type of storage service being a block storage service and the second type of storage service being an object storage service.

6. The method of claim 1, the first representation of the media object comprising a high-resolution version of a video clip in a first file and the second representation of the media object comprising a lower-resolution version of the video clip in a second file.

7. The method of claim 1, the first representation of the media object comprising a first video clip of a scene and the second representation of the media object comprising a second video clip of the scene, the second video clip comprising one or more of a different camera location or a different camera angle than the first video clip.

8. The method of claim 1, the first mount and the second mount being mounted in a same logical drive of the local file system.

9. The method of claim 1, the first location and the second location being separate locations in a same storage medium.

10. The method of claim 1 wherein the first representation of the media object and the second representation of the media object both have a same run time.

11. The method of claim 1, the first type of storage service being a block storage service and the second type of storage service being an object storage service.

12. A system for presenting a media object to a media editing application, comprising:
a storage service configured to (a) map a first mount in a local file system to a first location in a first type of storage service, the first location comprising a first representation of the media object, and (b) map a second mount in the local file system to a second location in a second type of storage service, the second location comprising a second representation of the media object that is timecode-aligned with the first representation of the media object, the second representation being different from the first representation;
a media asset manager configured to provide metadata associated with the media object to a software add-on for the media editing application, the metadata indicating at least the first mount in the local file system and the second mount in the local file system; and
the software add-on for the media editing application, configured to provide the first mount in the local file system and the second mount in the local file system to the media editing application to enable the media editing application to switch between the first representation of the media object and the second representation of the media object via the local file system.

13. The system of claim 12, the media asset manager being further configured to:
receive the first representation of the media object;
generate the second representation of the media object based at least on the first representation of the media object; and
store the second representation of the media object in the second location.

14. The system of claim 12, the media asset manager being further configured to:
receive a first uniform resource indicator (URI) indicating the first location of the first representation of the media object in the first type of storage service; and
receive a second URI indicating the second location of the second representation of the media object in the second type of storage service.

15. The system of claim 12, the software add-on being a visually integrated add-on component for the media editing application.

16. One or more non-transitory computer-readable media storing instructions that, when executed by one or more processors, cause the one or more processors to perform operations comprising:
mapping a first mount in a local file system to a first location in a first type of storage service, the first location comprising a first representation of the media object;
mapping a second mount in the local file system to a second location in a second type of storage service, the second location comprising a second representation of the media object that is timecode-aligned with the first representation of the media object, the second representation being different from the first representation; and
providing the first mount in the local file system and the second mount in the local file system to the media editing application to enable the media editing application to switch between the first representation of the media object and the second representation of the media object via the local file system.

17. The one or more non-transitory computer-readable media of claim 16, the operations further comprising:
receiving, by a media asset manager, the first representation of the media object;
generating, by the media asset manager, the second representation of the media object based at least on the first representation of the media object; and
storing, by the media asset manager, the second representation of the media object in the second location.

18. The one or more non-transitory computer-readable media of claim 16, the operations further comprising:
   receiving a first uniform resource indicator (URI) indicating the first location of the first representation of the media object in the first type of storage service; and
   receiving a second URI indicating the second location of the second representation of the media object in the second type of storage service.

19. The one or more non-transitory computer-readable media of claim 16, the local file system comprising a Portable Operating System Interface (POSIX) file system and at least one of the first type of storage service and the second type of storage service being a non-POSIX storage service.

20. The one or more non-transitory computer-readable media of claim 19, the first type of storage service being a block storage service and the second type of storage service being an object storage service.

21. The one or more non-transitory computer-readable media of claim 16, the first mount and the second mount being mounted in a same logical drive of the local file system.

22. The one or more non-transitory computer-readable media of claim 16, the first location and the second location being separate locations in a same storage medium.

* * * * *